US007933674B2

(12) United States Patent
Driskill et al.

(10) Patent No.: US 7,933,674 B2
(45) Date of Patent: Apr. 26, 2011

(54) TOBACCO PRODUCT STAMPING MACHINE INTERFACE

(75) Inventors: David Driskill, Greenville, SC (US); Steven Morrison, Piedmont, SC (US); Richard Froehlich, Greenville, SC (US)

(73) Assignee: Velociti Alliance North America, Inc., Greenville, SC (US)

(*) Notice: Subject to any disclaimer, the term of this patent is extended or adjusted under 35 U.S.C. 154(b) by 589 days.

(21) Appl. No.: 12/053,039

(22) Filed: Mar. 21, 2008

(65) Prior Publication Data

US 2008/0168378 A1 Jul. 10, 2008

Related U.S. Application Data

(63) Continuation-in-part of application No. 12/046,697, filed on Mar. 12, 2008.

(51) Int. Cl.

| | |
|---|---|
| ***G06F 17/00*** | (2006.01) |
| ***G06F 19/00*** | (2006.01) |
| ***G06F 7/00*** | (2006.01) |
| ***A24C 5/32*** | (2006.01) |
| ***A24C 5/34*** | (2006.01) |
| ***A24C 1/10*** | (2006.01) |

(52) U.S. Cl. .......... 700/117; 700/90; 700/223; 700/103; 700/112; 131/50; 131/281; 131/280

(58) Field of Classification Search ........................ None
See application file for complete search history.

(56) References Cited

U.S. PATENT DOCUMENTS

| | | | | |
|---|---|---|---|---|
| 6,610,954 | B2 | 8/2003 | Takizawa | 209/583 |
| 6,651,820 | B2 | 11/2003 | Takizawa | 209/546 |
| 6,680,452 | B2 | 1/2004 | Takizawa | 209/583 |
| 6,685,031 | B2 | 2/2004 | Takizawa | 209/546 |
| 7,117,872 | B2 * | 10/2006 | Draghetti et al. | 131/280 |
| 7,620,471 | B2 * | 11/2009 | Li Vigni et al. | 700/117 |
| 2002/0175112 | A1 | 11/2002 | Takizawa | 209/608 |
| 2002/0185141 | A1 * | 12/2002 | Heide | 131/281 |

* cited by examiner

*Primary Examiner* — Gene Crawford
*Assistant Examiner* — Yolanda Cumbess
(74) *Attorney, Agent, or Firm* — Christopher L. Holt; Westman, Champlin & Kelly, P.A.

(57) ABSTRACT

Disclosed herein are embodiments of a user interface associated with a tobacco product stamping machine. In one embodiment, the user interface includes a visual representation of a batch of tobacco product containers. The visual representation includes an indication of a plurality of tobacco product types included in the batch. The visual representation includes an indication of a number of containers of a first tobacco product type included in the batch.

16 Claims, 12 Drawing Sheets

TOBACCO PRODUCT STAMPING MACHINE INTERFACE

The present application is a continuation-in-part of, and is based on, and claims the benefit of U.S. utility patent application Ser. No. 12/046,697, filed on Mar. 12, 2008, the content of which is hereby incorporated by reference in its entirety.

BACKGROUND

Currently, there are many different types of materials handling systems. Typically, such a system will include equipment configured to move items between required locations on an automated and/or manually-initiated basis. Depending on the type of items being handled, some systems may incorporate the functionality of specialized equipment, such as equipment for weighing or performing some other measurement function within the materials handling system.

Some materials handling systems are designed specifically for processing packaged tobacco products, such as cartons of cigarettes. Currently, there are many disadvantages associated with such systems. For example, in terms of operator function, most systems require frequent movement of the operator to the product rather than bringing the product to the operator. Further, while some current systems support the passing of packages of tobacco products through a stamping machine, there are usually significant limitations on the flexibility of the stamping process. Still further, current systems commonly support the sorting of one package to a single order at a time.

The discussion above is merely provided for general background information and is not intended for use as an aid in determining the scope of the claimed subject matter. Also, the claimed subject matter is not limited to implementations that solve any or all disadvantages noted in this background section.

SUMMARY

Disclosed herein are embodiments of a user interface associated with a tobacco product stamping machine. In one embodiment, the user interface includes a visual representation of a batch of tobacco product containers. The visual representation includes an indication of a plurality of tobacco product types included in the batch. The visual representation includes an indication of a number of containers of a first tobacco product type included in the batch.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
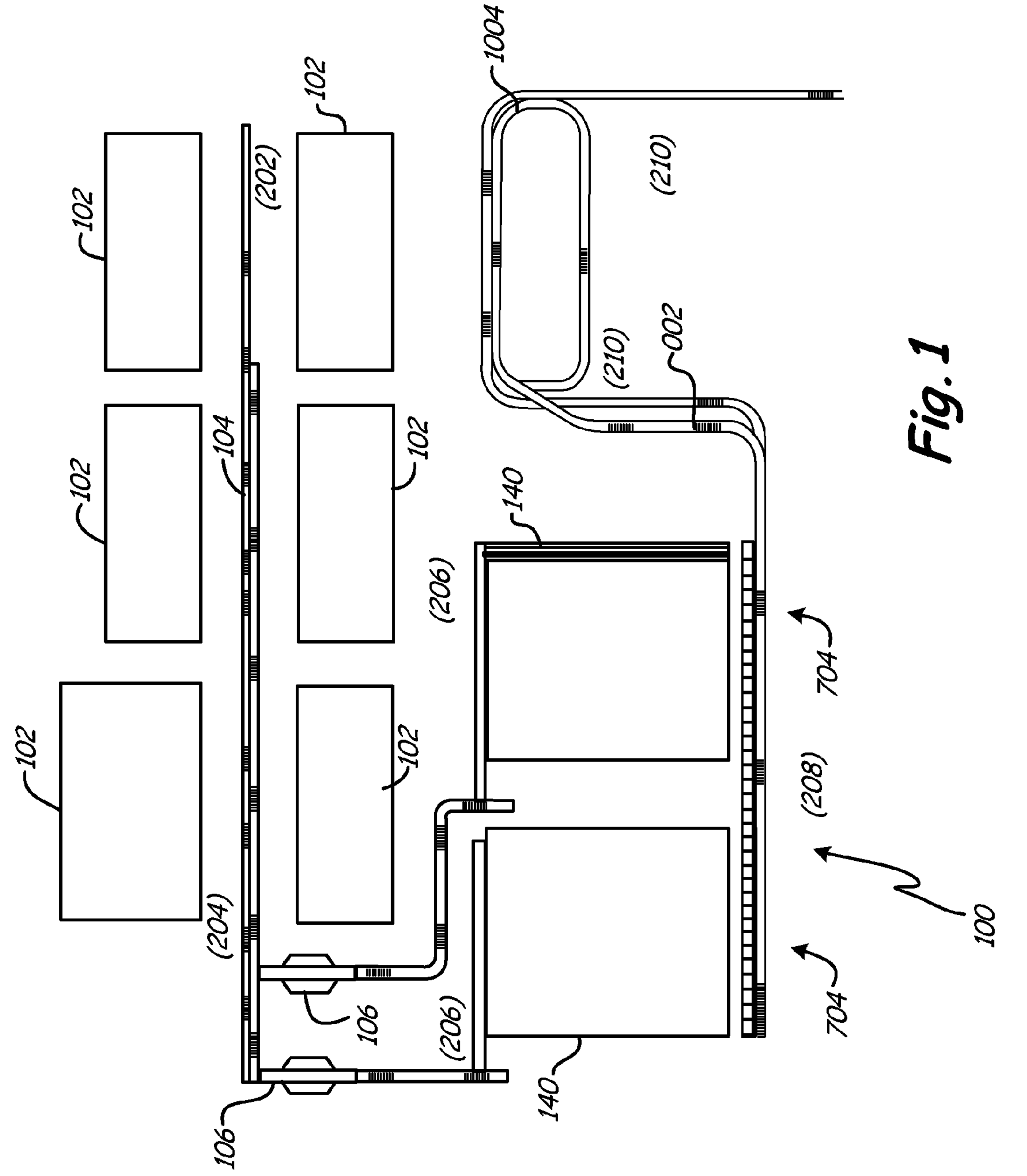
FIG. 1 is schematic diagram of a materials handling system for processing tobacco-oriented goods.
Figure 2:
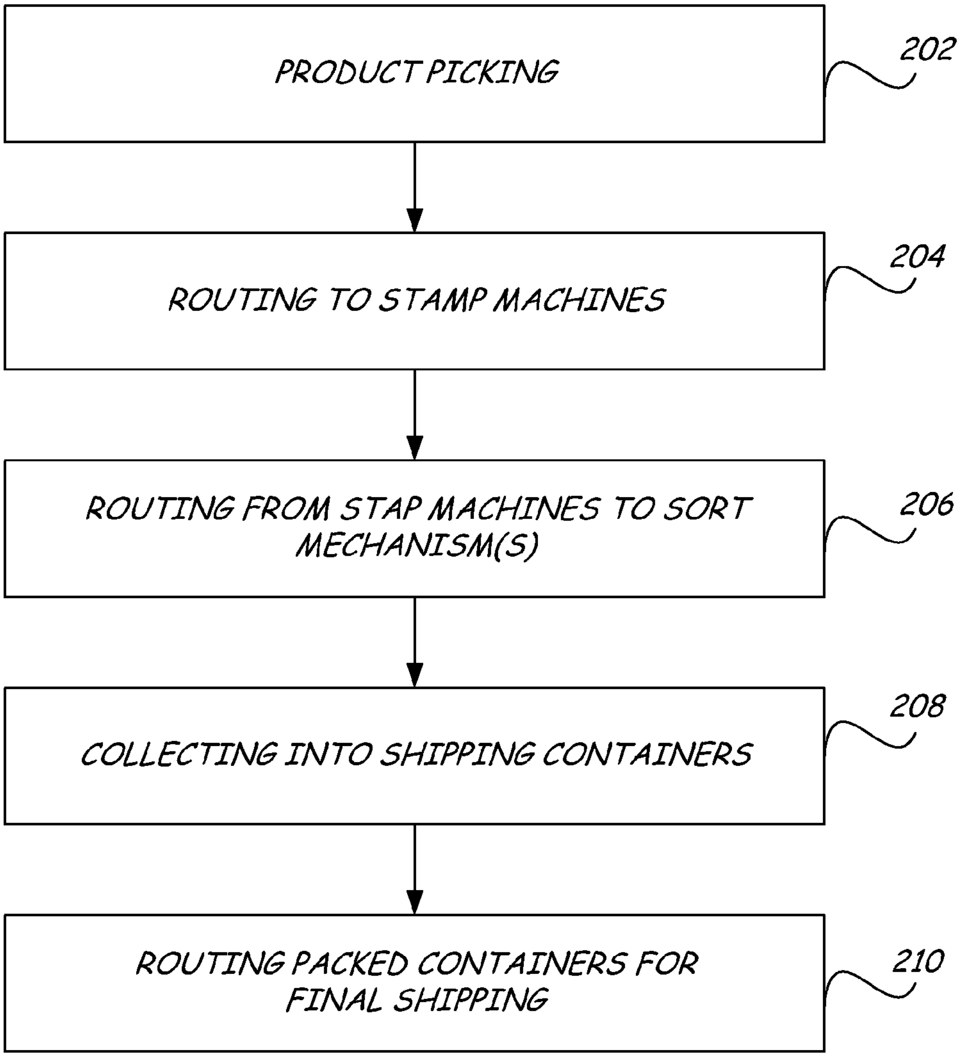
FIG. 2 is a flow chart diagram demonstrating process steps that, in one embodiment, are executed within the materials handling system.
Figure 3:
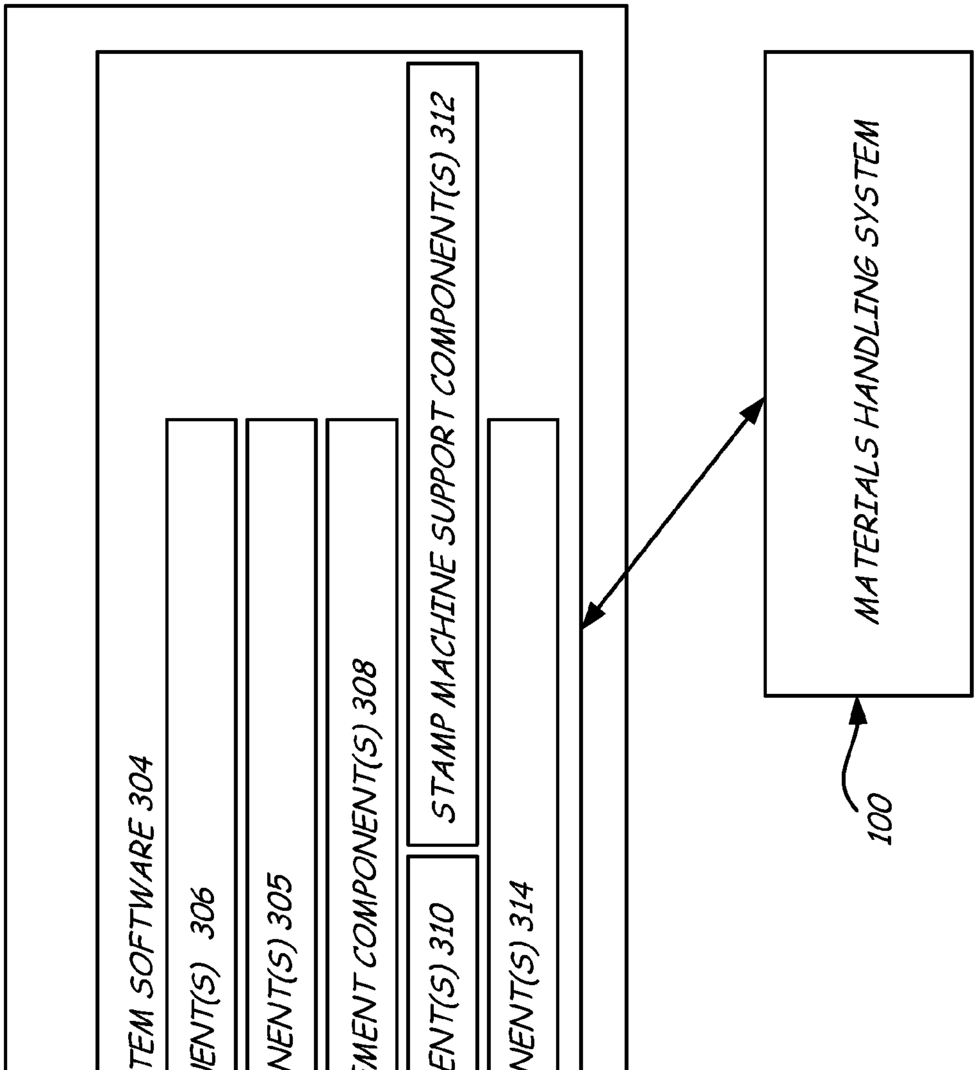
FIG. 3 is a schematic diagram of a computing device with materials handling system software operatively installed thereon.

FIG. 1 is a schematic diagram of a materials handling system 100 for processing packaged tobacco products, such as, but not necessarily limited to, cartons of cigarettes. FIG. 2 is a flow chart diagram demonstrating processing steps that occur within system 102. FIG. 3 is a schematic diagram of a computing device 302 having materials handling system software 304 operatively installed thereon. Software 304 is illustratively configured to facilitate the management of various functions associated with operation of materials handling system 100, many of which will be described in detail below. The components and operation of system 100 will be described in relation to the related process of FIG. 2, as well as in relation to related components of software 304.

In accordance with block 202 in FIG. 2, a first step in the overall materials handling process is product picking. Generally speaking, in the context of FIG. 1, the picking process involves removing cartons of cigarettes from picking stations 102 and placing them onto a conveyor 104 that moves the cartons from right to left (relative to the orientation of FIG. 1).

In one embodiment, software component 305 is configured to interface with system 100 so as to support management of the picking process. The precise details of configuration will vary depending upon the details of a given picking implementation. Without departing from the scope of the present invention, the picking process can be entirely automated, semi-automated or entirely manually accomplished. In one example of a purely manual implementation, a human selects cartons from one or more picking stations 102 based on instructions reflected in a paper-based listing, for example, a paper-based listing of what products should be picked and in what sequence.

In a typical semi-automated picking system, a human selects cartons from one or more of the picking stations 102 based on an electronically supported system that presents automated cues (e.g., visual or audible cues). In one embodiment, a mechanism is employed to verify that human has properly responded to the cues. For example, the system may require the human to provide feedback (e.g., pushing a button, speak a command into a microphone, etc.) to verify compliance with a particular cue, which illustratively triggers initiation of the next cue. An alarm or some other response is illustratively provided if feedback from the human picker is inconsistent with expectations based on the currently active cue.

In a more specific example of a semi-automated picking system, an LED is illuminated to identify a product type (e.g., the identity, SKU and/or location) as the next candidate for picking. The same or a different LED mechanism also indicates the quantity to be picked. Once picked, the LED mechanism or mechanisms are turned off in a manner that indicates compliance with the picking instruction. This may occur in any of a variety of different ways such as, but not limited to, depression of a button by the human picker. Alternatively, the indicator(s) may be automatically extinguished when determined by a sensor (e.g., an electronic eye, a laser sensor, etc.) that the current picking instruction is likely to have been fulfilled.

In another example, an audibly directed picking system is implemented wherein audible commands are transmitted to an operator-worn headset to notify a human operator of the next pick location, quantity, description, check digit for verification purposes, and/or some other form of instruction. In one embodiment, the operator speaks into a microphone to notify the system, via speech recognition, of exceptions and/or pick verification. It should be noted that hybrid systems are also within the scope of the present invention, such as a system wherein visual aids are utilized to provide picking locations and audible cues are utilized to indicate the applicable quantity, exceptions, completions, and/or other picking-related information.

Those skilled in the art will appreciate that the picking implementations provided in the previous paragraphs are simply examples of many alternatives within the scope of the present invention. Fully automated alternatives, such as where machines handle automatically the process of moving cartons to conveyer 104, are also within the scope of the present invention. The present invention is not limited to any one particular means for implementing the picking process.

In one embodiment, not by limitation, picking stations 102 include shelves containing cigarettes in bulk quantities organized by type. For example, cartons of a particular type of Marlboro cigarettes are grouped together in a first location while cartons of a particular type of Camel cigarettes are grouped together in a different location (though a given type might be stocked in more than one location).

In one embodiment, logic is applied to selectively organize and distribute products across and/or within the picking stations 104. For example, certain types of product may be assigned certain locations based on an objective criteria such as, but not necessarily limited to, anticipated quantities needed. In this case, a type likely to be needed relatively frequently might be assigned a location that is easier to access (e.g., by a human) than a location assigned to a type that is likely to be less frequently needed. Or, a type of product likely to be needed in large quantities might be assigned a location that is easier to access than a location assigned to a type that is more likely to be needed in small quantities. One area might be reserved for picking large quantities (e.g., cases of cartons) of a product while another area might be reserved for picking small quantities (e.g., individual cartons) of the same product. Those skilled in the art will appreciate that it is within the scope of the present invention to organize products across and/or within picking stations 102 based on any basis. The basis may include, but is not limited to, the goal of maximizing efficiency (e.g., reducing the amount of movement required for a human participating in the picking process).

Picking instructions are illustratively generated within software system 304 (e.g., by support components 305) and issued into materials handling system 100 as appropriate depending upon the nature of the implemented picking system. In one embodiment, the picking instructions are organized around the concept of an order. For example, all components of a first order are picked (e.g., placed on conveyer 104). Then, then all the components of a second order are picked. This process continues until all orders have been picked. Some efficiency considerations may be worked in to the order-based picking process. For example, certain orders may be given higher priority than others for a variety of different reasons (e.g., truck scheduling, etc.). Or, the components within an order may be organized to minimize how much a human picker must move around while picking the order. However, it is typically true that all components of a first order must be picked before moving on to a second order. To compromise this mandate will typically mean compromising the accuracy of order management downstream in the system.

In one embodiment, as is shown in FIG. 3, materials handling software system 304 includes a batch handling component 306. Component 306 is illustratively a software tool that enables a user to influence the quantity and type of products to be picked, as well as the order in which picking occurs. How this influence is translated to the picking process is dependent upon the nature of the picking system. For example, in one embodiment, in a purely manual system, software component 306 is configured to assist in the generation of a list or lists from which one or more human pickers work. In another embodiment, in a semi-automated system, software component 306 is configured to influence what cues are provided to one or more human pickers. In yet another embodiment, in an automated system, software component 306 is configured to influence the operation of the machines responsible for the picking process. Those skilled in the art will appreciate that the precise functionality of software component 306 is at least partially dependent upon the nature of the applicable picking implementation.

In accordance with one embodiment, picking instructions generated by component 306 are organized around the concept of a batch. Generally speaking, a single batch may contain components from different orders. Typically, components of a first batch are picked followed by the picking of components of a second batch, and so on and so forth until all batches have been picked. The assumption is that orders can be mixed because other mechanisms are utilized downstream in the system in order to organize on an order-specific basis. The components of a batch are typically picked from a single inventory of product (e.g., distributed across picking stations 102). A human participant in a batch-based picking process illustratively may not be aware (e.g., may receive no indication) of what specific order he or she is in the process of picking.

In one embodiment, software component 306 is configured to receive indications of orders and generate corresponding batch-based picking orders in accordance with one or more user-selected and/or default organizing principles. This illustratively, but not necessarily, means combining components of different orders into the same batch. This is not to say that batch-based picking instructions must originate within materials handling system software 306. Those skilled in the art will appreciate that batch-based picking instructions can be generated by an external system and transmitted to software 304 (e.g., to component 306) for processing within the applicable picking system (e.g., system 100).

As has been alluded to, the batch-based picking instructions can be organized based on any of a variety of different user-selected and/or default parameters. For example, not by limitation, software component 306 can be configured to create batches so as to optimize one or more of the following constraints in any combination: 1) desired order completion cutoff time; 2) desired truck route or routs; 3) desired carton size or sizes in a batch; 4) target overall batch size; and/or 5) target work effort to complete the batch. In one embodiment, all available orders are merged into the batching process. In another embodiment; however, software 304 and/or system 100 are configured to support either or both batch-based and order-based picking.

Figure 4:
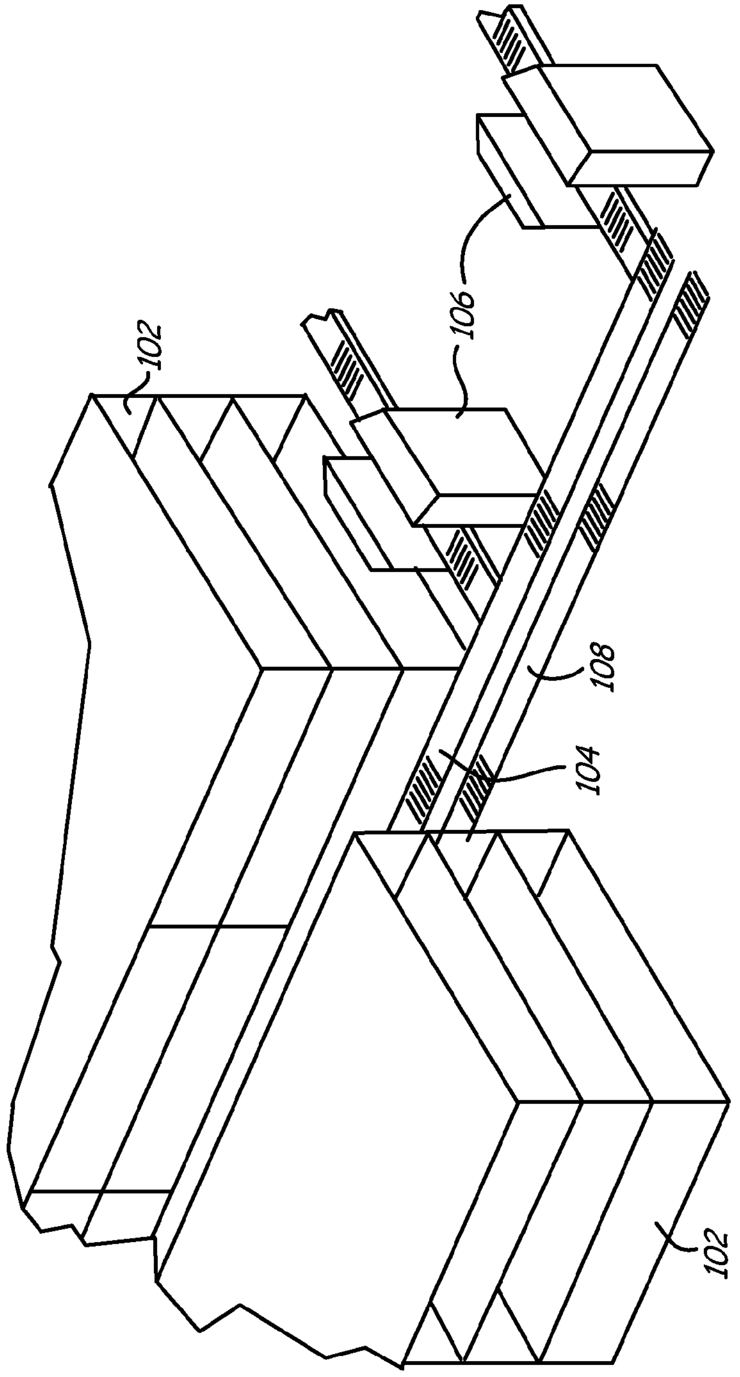
FIG. 4 is a perspective view of a portion of the materials handling system.

FIG. 4 is a perspective view of a portion of system 100. The view shows the two picking stations 102 that are located closest to a pair of stamping machines 106. Stations 102 are shown as empty but would more typically be stocked with products. Conveyer 104 is shown in FIG. 4. Picked cartons of tobacco products move down conveyer 104 toward stamping machines 106.

In one embodiment, items are picked in either case quantities (e.g., 30 cartons per case) or individual cartons (based on picking instructions). Picked cartons are placed on conveyor 104 and, in one embodiment, are oriented such that the widest dimension of the carton is perpendicular to the direction of travel. The flaps of the carton are illustratively oriented so as to be conducive to properly entering stamping machines 106. A second takeaway conveyer 108 is illustratively provided and operates beneath conveyor 104. Case quantities are placed onto the lower conveyor 108.

Thus, an instruction to pick a large quantity of a given product can be picked by placing a case of the product on the lower conveyor and then one or more individual cartons on the upper conveyor as necessary to round out the total number of cartons needed. In one embodiment, such a picking instruction requires the person picking to use their intuition to determine when a case can be picked rather than individual cartons. In another embodiment; however, picking support components 305 are configured to automate such determinations and incorporate the option of case picking into the picking instructions. Depending on exactly how the rest of system 100 is set up, assumptions based on the expectation of one or more cases may or may not be made downstream from the picking process. For example, if an instruction is made to pick a case, then downstream processing may or may not require the case to turn up on the lower conveyor rather than an equivalent amount being picked individually and placed on the upper conveyor. Whether or not there will be such a dependency is a detail that is likely to be implementation-specific.

In accordance with block 204 in FIG. 2, a next step in the process is to route picked products to stamping machines 106. At this point, it is probably a good idea to emphasize that the present invention is not limited to the particular configuration of system components shown in FIG. 1. Those skilled in the art will appreciate that a given implementation is likely to be highly customized to match the given needs of a particular owner or operator. With that in mind, it should be pointed out that the present invention is not limited to incorporating two stamp machines 106. More or fewer stamping machines can be implemented without departing from the scope of the present invention. However, solely for the purpose of describing various aspects of the present invention in detail, the illustrated case of two stamping machines will be assumed.

Figure 5:
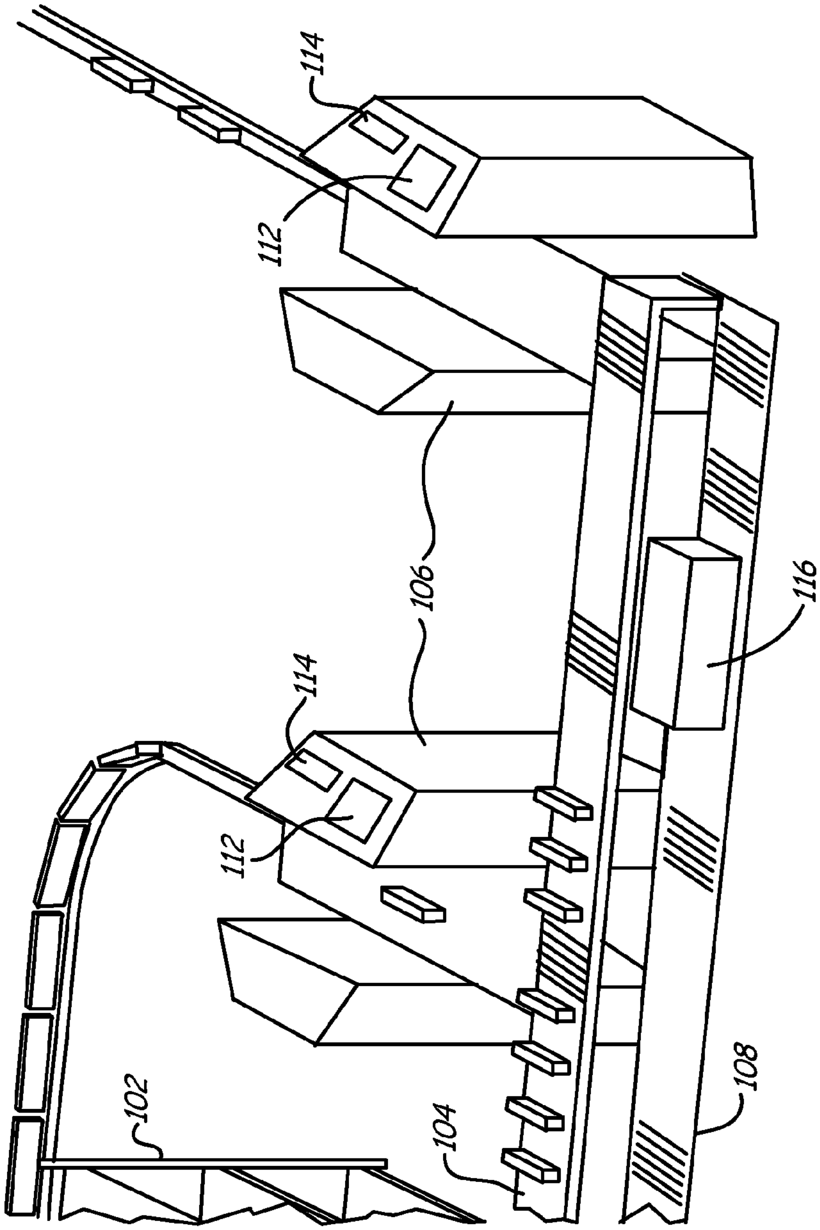
FIG. 5 is a perspective view of a portion of the materials handling system.

In one embodiment, as products exit the picking area and approach the stamp machines, two pick conveyors feed the stamp machines 106. As is shown in FIG. 5, a lower conveyor handles bulk quantities. A case 116, which assumedly contains individual cartons, is shown on the lower conveyor for illustratively purposes. In one embodiment, case quantities are diverted from the lower conveyor into a stamping workstation as determined to be appropriate based on applicable processing parameters. A component of software 304, namely, a location management component 308, is illustratively configured to account for such parameters and trigger mechanical functionality within system 100 as necessary to appropriately move items through the system.

When a case arrives at a stamping work station, a human operator (e.g., an operator of the corresponding stamping machine 106) unloads the cases and manually places the individual cartons onto an induction conveyor associated with the stamp machine. In one embodiment, instructions and/or information related to this bulk unloading task are provided by way of interface 112. In one embodiment, when the task has been completed, an indication of completion is provided to location management component 308 by way of input mechanism 114. When a processing error occurs (e.g., a bulk item does not get unpacked, etc.), an exception is illustratively triggered within component 308 and communicates through operator interface 112. It should be noted that, it is also within the scope of the present invention to make unloading the bulk quantities into the stamp machine an automated process.

Figure 6:
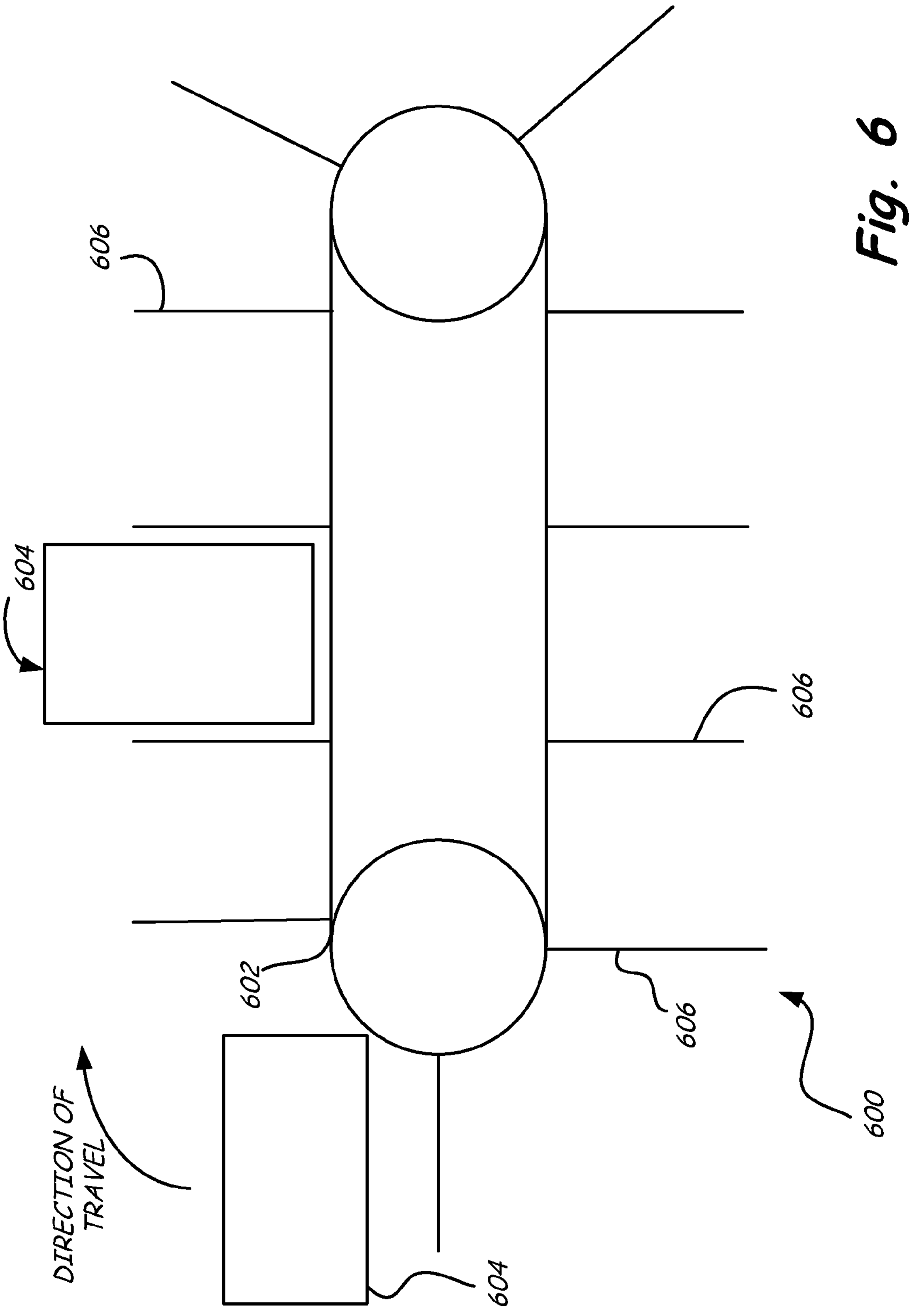
FIG. 6 is a simplified schematic representation of a specialized conveyor system.

In one embodiment, in order to facilitate routing to an appropriate stamping machine 106, individual cartons on the upper conveyor are transferred onto a specialized conveyor system. FIG. 6 is a simplified schematic representation of the specialized conveyor system, which is identified in the Figure as conveyor 600. Conveyor 600 has a plurality of partitions 606 (a representative few of which have been labeled) that extend generally perpendicular to the surface 602 of the conveyor. The spacing between partitions is illustratively slightly more than the narrowest dimension of a carton positioned perpendicular to the direction of conveyor travel.

In one embodiment, as cartons are transferred from the upper conveyor 104 into specialized conveyor system 600 (e.g., similar to the two sample cartons 604 shown in FIG. 6), a reader reads an identifier from each carton. Those skilled in the art will appreciate that this identification process could involve application of any of a number of different identifying technologies including but not limited to an RFID identification system, a barcode identification system, a CCD device identification system, or any other identification system. In one embodiment, this information is fed into an item tracking component 310, which is part of software system 304. Component 310 illustratively associated the carton's ID with its position in the partitioned conveyor 600.

In one embodiment, item location management component 308 receives item location information from item tracking component 310 and utilizes it as a basis for sorting cartons into appropriate stamping machines. For example, as cartons move on conveyor 600 proximate to the entry points of stamping machines 106, component 308 selectively energizes one or more pushing devices to selectively push cartons into appropriate stamping machines. The determination as to the optimum path for a given carton (i.e., which is the correct stamping machine) is illustratively based upon system parameters that are set by system default and/or on a user-selectable basis (e.g., set by an operator of software 304).

In one embodiment, software 304 is configured to support sorting cartons through stamping machines based upon the taxing authority or authorities for which each individual stamping machine is set up to support stamping functionality. It is specifically within the scope of the present invention for multiple taxing authorities to be picked in a single batch. For example, the components of a single picked batch may move through different stamp machines set up to support different taxing authorities. This is particularly interesting in light of the fact that, as has been discussed, a given batch may contain components from more than one order (e.g., multiple orders headed to different locations).

In another embodiment, software 304 is configured to support sorting cartons through stamping machines based upon optimization of the total order fulfillment cycle for a given batch, or for some other measurement standard such as but not limited to a period of an entire shift. Those skilled in the art will appreciate that software 304 can be configured to support sorting cartons through stamping machines based on many different factors in addition to those specifically listed herein, to which the scope of the present invention is not limited.

In one embodiment, cartons may be sorted among stamping machines based upon an administrator-or operator-defined set of rules that are created within software system 304. In one embodiment, if a carton is not destined for any of the stamping machines for any reason, the software is configured to stop the partitioned conveyor, as well as all conveyors upstream as required. Or, in one embodiment, the software is configured to push the carton(s) into an exception handling area, for example. In one embodiment, the handling of such exceptions is configurable based upon an administrator-or operator-selectable option.

Those skilled in the art will appreciate that the display 112 and input mechanism 114 (FIG. 5) associated each stamp machine 106 can be configured to support a variety of different functions. Software system 304 includes stamp machine support components 312 for supporting such functionality.

In one embodiment, as cartons are scanned (e.g., while being moved into conveyor 600), components 312 are configured to indicate on display 112 the quantity of cartons scanned compared against a total required for each stamping machine and/or the tax jurisdiction(s) for which the stamping machine is configured. In one embodiment, components 312 are configured to enable an operator to input (e.g., through mechanism 114, through a touch screen implementation of display 112, etc.) information or exceptions as cartons are stamped. For example, the operator is able to enter commands or notifications to cause software 304 to initiate an appropriate response in unusual circumstances such as, but not limited to, if there is damage to a carton, if a stamping machine becomes inoperable, or if other unusual situations arise during stamping.

In one embodiment, software components 312 are configured to provide, through display 112, instructions for operators who receive full case quantities (e.g., on the lower conveyor coming from the picking area) so that they know how many cartons to remove from the case and route into the stamping machine. For example, it is conceivable that the system may be configured to enable less than all cartons (e.g., less than all 30 cartons) in a bulk amount received to be indicated for processing.

In one aspect of the present invention, as cartons move through stamping machines 106 and are stamped with their unique tax jurisdictional stamp or stamps, an additional step is taken to support the subsequent tracking of each carton within system 100. In one embodiment, a first identifying mark is applied to each carton. The first identifying mark illustratively does not deface the carton and, in one embodiment, is invisible in that it is generally imperceptible to the human eye but can be made visible (e.g., by placing under a black light), and/or is visible to a scanner designed to "see" such marks. In addition or alternatively, a second identifying mark that does deface the carton (e.g., a bar code label) is applied (e.g., blown onto) to each carton. The application and tracking of labels is illustratively managed by one or more of the sub-components of software system 304.

Various embodiments and components of the present invention involve applying identifiers to product units and/or reading identifiers associated with product units. Those skilled in the art will appreciate that these identification processes could involve application of any of a number of different identifying technologies including but not limited to an RFID identification system, a barcode identification system, a CCD device identification system, or any other identification system. To the extent that the present description identifies specific technologies, the specific technologies are provided as but one example of an implementation within the scope of the present invention.

In accordance with block 206 in FIG. 2, a next step in the process is to route cartons from stamp machines 106 to one or more sorting mechanisms 140. In FIG. 1, each stamp machine 106 is associated with a separate sorting mechanism. Those skilled in the art will appreciate that this is not the only configuration within the scope of the present invention.

For example, in one embodiment, multiple stamp machines 106 feed into the same sorting mechanism 140. In another embodiment, one stamp machines feeds into multiple sorting mechanisms 140. In general, it is within the scope of the present invention to customize the configuration of system 100 (add, subtract and/or re-arrange the system components) as necessary to fulfill applicable needs. It is also within the scope of the present invention that software system 304 is flexibly configured to effectively support all such configurations.

In one embodiment, as is generally shown in FIG. 5, cartons are transferred out of a stamp machine 106 and onto a conveyor that is configured to transport the cartons such that the longest dimension travels parallel to the direction of conveyor flow. However, it is also within the scope of the present invention for cartons to be ejected from a stamping machine 106 directly into a sort mechanism 140. Whether cartons are directly or indirectly transferred into a sorting mechanism is dependent on a variety of implementation-specific details such as physical space limitations and configurations at a particular site where a system 100 is to be installed.

In one embodiment, a carton approaches a sorting mechanism 140 and is loaded into a specialized sorting conveyor system. In one embodiment, the specialized sorting conveyor system is configured the same or similar to conveyor 600 shown in FIG. 6. The conveyor has a plurality of partitions that extend generally perpendicular to the surface of the conveyor. The spacing between partitions is illustratively slightly more than the narrowest dimension of a carton positioned perpendicular to the direction of conveyor travel. Cartons feed into the specialized sorting conveyor system as was described in relation to FIG. 6.

Figure 7:
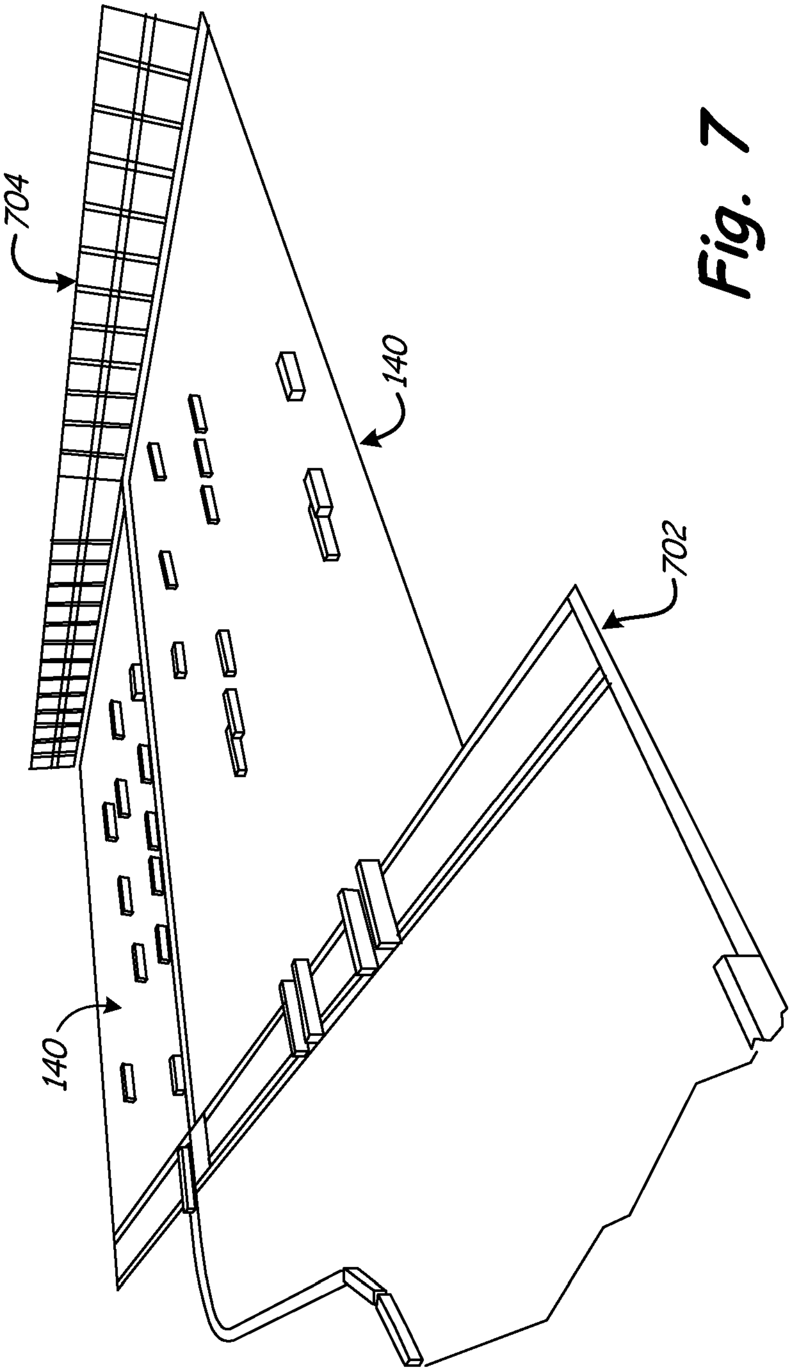
FIG. 7 is a perspective view of a portion of the materials handling system.

FIG. 7 is a schematic illustration demonstrating movement of cartons into and through a sorting mechanism 140. At point 702, cartons are transferred from a conveyor that moves cartons (moving parallel to the longest dimension) to a partitioned conveyor the same or similar to conveyor 600 in FIG. 6 (e.g., wherein cartons are moved perpendicular to the longest dimension). It should be noted that, referring to FIG. 7, the sorting mechanism located more toward the top of the Figure is equipped with its own specialized sort conveyor for moving the other stream of cartons through the other sorting mechanism 140. Also, it should be emphasized that it is also within the scope of the present invention to transfer cartons directly from a stamping machine 106 into one of the partitioned sorting conveyors associated with the sorting mechanism 140.

In one embodiment, as cartons are transferred into the specialized sorting conveyors, a devices reads an identifier associated with each carton (e.g., a barcode scanner reads the manufacturer-applied barcode from each carton) (though this additional item tracking step may be optional for a given implementation). Those skilled in the art will appreciate that this identification process could involve application of any of a number of different identifying technologies including but not limited to an RFID identification system, a barcode identification system, a CCD device identification system, or any other identification system. In one embodiment, this information is fed into item tracking component 310, which is part of software system 304. Component 310 illustratively associated the carton's ID with its position in the partitioned conveyor.

In one embodiment, item location management component 308 receives item location information from item tracking component 310 and utilizes it as a basis for selectively ejecting cartons (e.g., by selectively energizing one or more pushing mechanisms) onto a takeaway conveyer. FIG. 7 shows ejected cartons moving (longest dimension parallel to the direction of motion) along the takeaway conveyor toward a plurality of boxes 704. The determination as to the optimum path for a given carton (i.e., which boxes 704 to move toward) is illustratively based upon system parameters that are set by system default and/or on a user-selectable basis (e.g., set by an operator of software 304).

Thus, as a carton moves into the eject window of a conveyor, a pushing mechanism ejects the carton onto the takeaway conveyor. In one embodiment, the ejection determination is based at least in part on the order to which the carton is assigned (e.g., the assignment of orders being tracked by a component of software 304).

Those skilled in the art will appreciate that it is within the scope of the present invention to adjacently line up multiple takeaway conveyors. In one embodiment, each takeaway conveyor has its own specialized sorting conveyor system (e.g., similar to conveyor 600), the hardware and software being configured to appropriately route a given carton to the takeaway conveyor associated with the carton's final destination while bypassing the other takeaway conveyors. In another embodiment, a single specialized sorting conveyor feeds multiple takeaway conveyors (e.g., the carton moves along all the takeaway conveyors until ejection from the specialized sorting conveyor is appropriate based on system parameters).

Regardless of the configuration of sorting mechanisms 140, and regardless of whether there is more than one, the purpose of the mechanism or mechanisms is illustratively to sort the cartons based on parameters set within software 304. The parameters are indicative of one or more bases for organization such as but not limited to order-oriented organization. Those skilled in the art will appreciate that software 304 can be configured to support sorting cartons through sorting mechanisms 140 based on many different factors in addition to order-oriented organization, to which the scope of the present invention is not limited. In one embodiment, cartons may be sorted based upon an administrator-or operator-defined set of rules that are created within software system 304. Finally, it is worth specifically pointing out that it is within the scope of the present invention for cartons to be picked on a batch-oriented basis (e.g., with multiple orders distributed across a single batch) and then, after the stamping process, sorted on an order-specific or some other basis.

Figure 8:
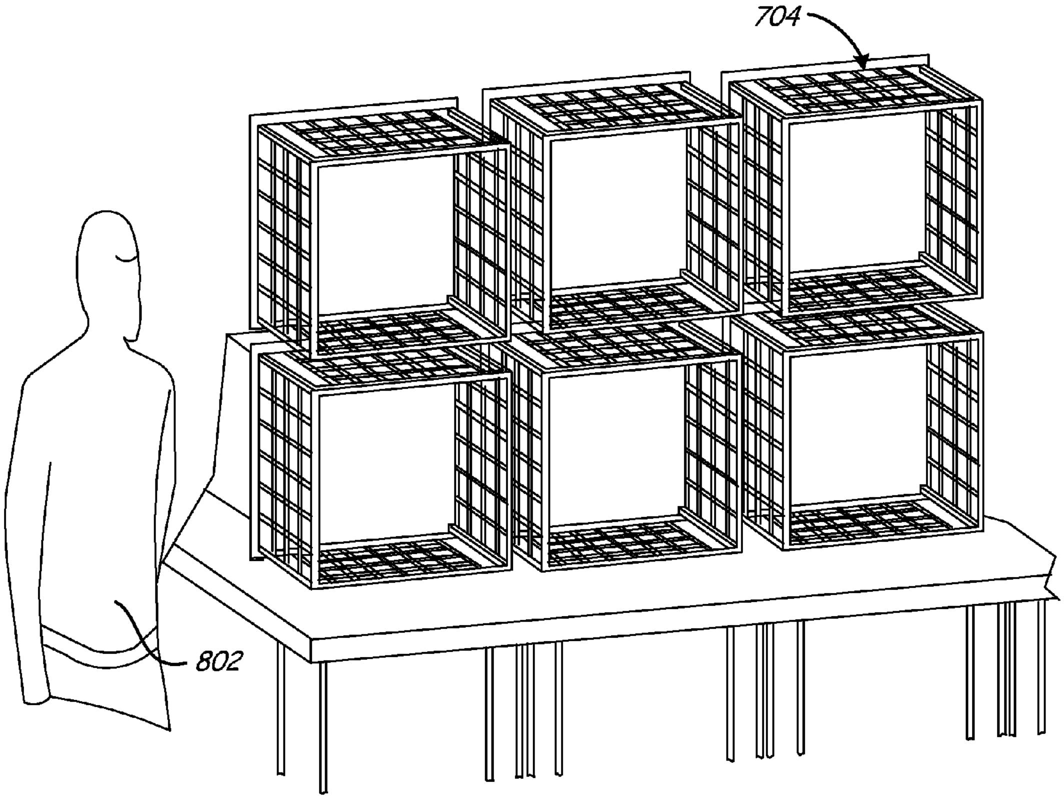
FIG. 8 is a perspective view of a portion of the materials handling system.

In accordance with step 208, a next step in the process is to collect the cartons from the end of the sorting mechanism takeaway conveyers and pack them into boxes 704. When cartons arrive at the end of the sort mechanism takeaway conveyor, they are sorted to the extent that an operator can simply pick them up directly from the end of the conveyor and place them into a corresponding box 704. FIG. 8 is a schematic illustration showing an operator 802 standing in front of boxes 704.

Cartons that are grouped along parallel sort mechanism takeaway conveyors are presented for packing in such a manner that multiple cartons can be picked up and packed into boxes 704 in a single motion (as opposed to packing cartons one at a time). The packer must, however, still determine how many cartons to pack into which boxes. Without departing from the scope of the present invention, the process of moving cartons from the end of the sorting mechanism takeaway conveyor into boxes 704 can be entirely automated, semi-automated or entirely manually accomplished. Packing system software components 314 are illustratively configured to support the implemented packing functionality.

In one example of a purely manual implementation, a human operator picks up the cartons and simply places them in pre-assigned boxes. The operator may be guided by instructions reflected in a paper-based listing, for example, a paper-based listing of what products should be packed where. In one embodiment, software component 314 is configured to support the generation of the paper-based listing based on default and/or administrator-or operator-selectable system parameters.

In one embodiment of a semi-automated implementation, the operator picks up cartons and decides which box to put them based on an electronically supported system that presents automated cues (e.g., visual or audible cues). In one embodiment, a mechanism is employed to verify that human has properly responded to the cues. For example, the system may require the human to provide feedback (e.g., pushing a button, speak a command into a microphone, etc.) to verify compliance with a particular cue, which illustratively triggers initiation of the next cue. An alarm or some other response is illustratively provided if feedback from the operator is inconsistent with expectations based on the currently active cue. In one embodiment, software component 314 is configured to support the management of the semi-automated packing process (including the handling of exceptions or errors) based on default and/or administrator-or operator-selectable system parameters.

In a more specific example of a semi-automated implementation, an LED is illuminated to identify cartons (e.g., the identity, SKU and/or location) as the next candidate for packing. The same or a different LED mechanism also indicates the quantity to be packed. The same or different LED mechanism identifies what box to pack the cartons in. Once packed, the LED mechanism or mechanisms are turned off in a manner that indicates compliance with the picking instruction. This may occur in any of a variety of different ways such as, but not limited to, depression of a button by the operator. Alternatively, the indicator(s) may be automatically extinguished when determined by a sensor (e.g., an electronic eye, a laser sensor, etc.) that the current picking instruction is likely to have been fulfilled. In one embodiment, software component 314 is configured to support the management of the semi-automated process (including the handling of exceptions or errors) based on default and/or administrator-or operator-selectable system parameters.

In another example, an audibly directed system is implemented wherein audible commands are transmitted to an operator-worn headset to notify a human operator of the next box to pack in, a quantity to be packed, and/or some other form of instruction. In one embodiment, the operator speaks into a microphone to notify the system, via speech recognition, of exceptions and/or packing verification. It should be noted that hybrid systems are also within the scope of the present invention, such as a system wherein visual aids are utilized to provide packing locations and audible cues are utilized to indicate the applicable quantity, exceptions, completions, and/or other packing-related information. In one embodiment, software component 314 is configured to support the management of the packing process (including the handling of exceptions or errors) based on default and/or administrator-or operator-selectable system parameters.

In one embodiment, pick-up sensors are provided at the carton pick-up point on the proximal end of the sorting mechanism takeaway conveyor. The sensors are illustratively configured to produce a signal indicating when cartons have been picked up, and to identify which parallel row of the sorting takeaway conveyor the picked up cartons belong to. Put-down sensors are illustratively provided proximate boxes 704 and are configured to identify in which box 704 picked up cartons have been placed.

Figure 9:
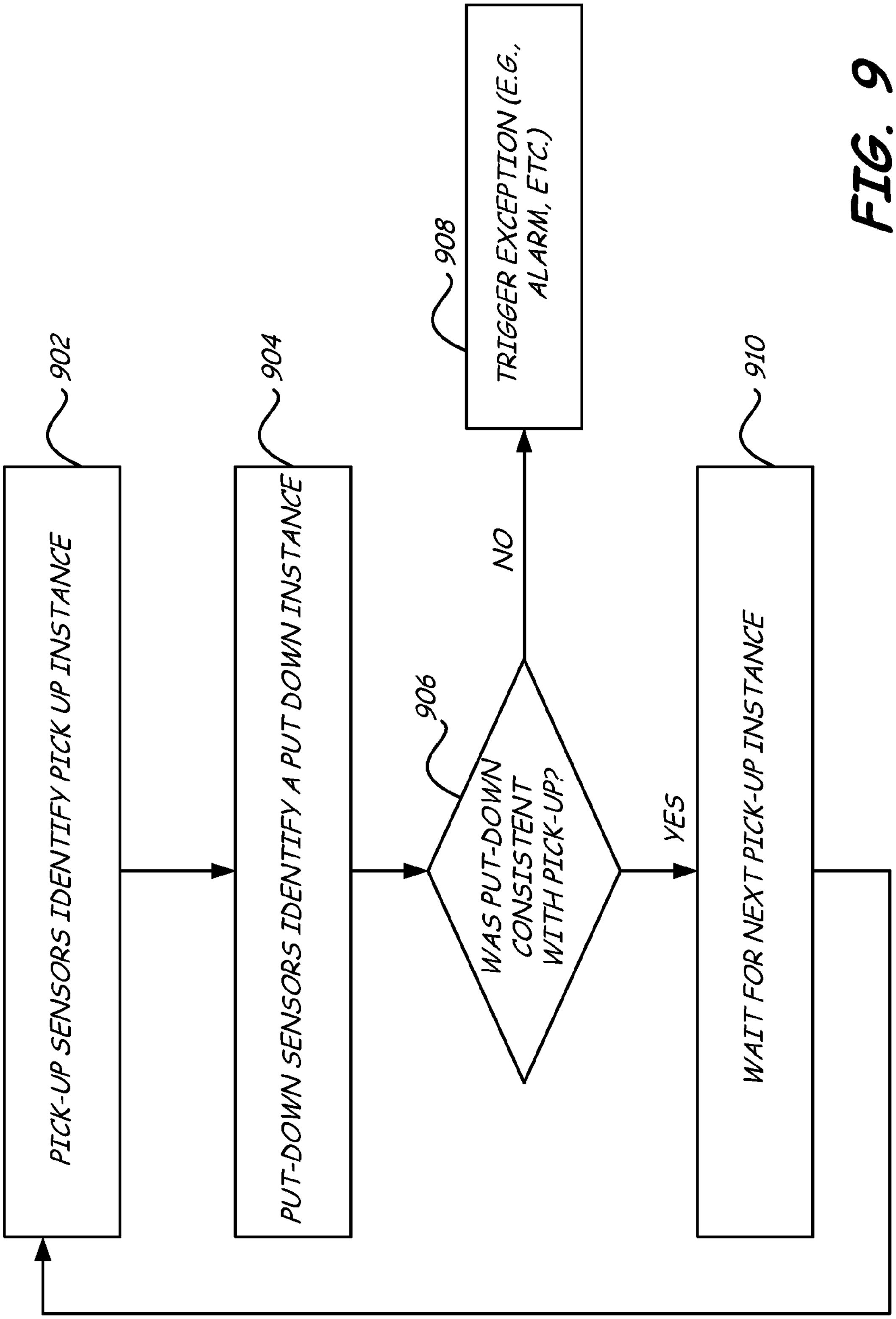
FIG. 9 is a flow chart diagram demonstrating steps associated with a packing process.

FIG. 9 is a flow chart diagram demonstrating steps associated with one implementation of pick-up and put-down sensors. In accordance with box 902, pick-up sensors identify a pick-up instance. In accordance with block 904, put-down sensors identify a putdown instance. In accordance with block 906 a determination is made as to whether the put-down is consistent with the pick-up (e.g., whether it was an accurate put-down). If not, in accordance with box 908, an exception or error-handling process is initiated (e.g., an alarm is triggered, etc.). In accordance with box 910, if the put-down was accurate, the process is repeated following the next sensed pick-up instance. In one embodiment, software component 314 is configured to support the management of the pick-up/put-down process (including the handling of exceptions or errors) based on default and/or administrator-or operator-selectable system parameters. In one embodiment, the described pick-up/put-down system is implemented in conjunction with a system, such as but not limited to those described herein, for instructing the operator as to which items to pick up and where to put them.

Those skilled in the art will appreciate that the implementations provided in the previous paragraphs are simply examples of many alternatives within the scope of the present invention. Fully automated alternatives, such as where machines handle automatically the process of moving cartons into boxes 704, are also within the scope of the present invention. The present invention is not limited to any one particular means for implementing the packing process.

In accordance with one embodiment, one or more display panels are made visible to an operator responsible for packing boxes 704. When a shipping container (i.e., a box 704) is full, software system 304 causes the display panel(s) to show a graphical depiction of what the full container should look like from the operator's point of view. For example, the brand logos on the end of the cartons collectively form an image of sorts. The operator compares the graphical representation on the display panel to the appearance of the cartons in a full box. In this manner, the operator uses the display panel as a mechanism to verify that the shipping container has been properly filled. In one embodiment, filling exceptions or errors are reported and/or corrected by interacting with software system 304 through inputs into the display panel or an associated input mechanism.

In one embodiment, after a container (e.g., a box 704) has been properly filled, a shipping label is manually or automatically applied (though it is also within the scope of the present invention to apply the shipping label before or during the packing process). In one embodiment, the box content (e.g., by SKU, by quantity, etc.) is indicated on the label. Once labeled, the container is put on a takeaway conveyor. In one embodiment, with reference to FIG. 8, user 802 can send out a fully packed and labeled box 704 simply pushing the box backwards onto a takeaway conveyor located behind the boxes.

Figure 10:
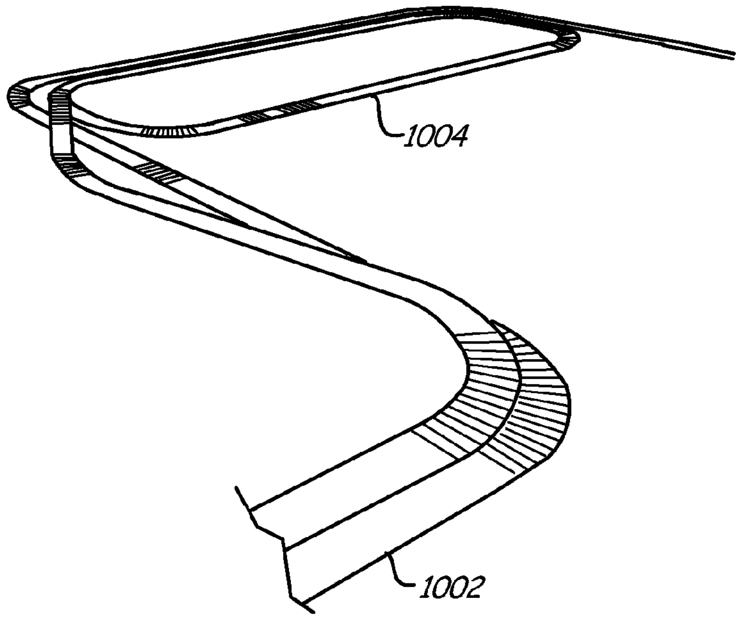
FIG. 10 is a perspective view of a portion of the materials handling system.

In accordance with block 210, another step in the process is the routing of the packed containers for final shipping. FIG. 10 is a schematic representation of an accumulation area 1004. Full containers (e.g., the containers pushed back onto takeaway conveyors by user 802 in FIG. 8) are moved into the accumulation area on conveyors 1002. Two conveyors, an upper conveyor configured to move boxes 704 stacked on top and a lower conveyor configured to move boxes 704 stacked on bottom, are shown in FIGS. 1 and 8. However, more or fewer takeaway conveyors can be implemented to support a particular packing station configuration (e.g., to support more or fewer sorting mechanisms 140).

In one embodiment, as containers approach accumulation area 1004, a reader (e.g., a radio frequency reader, a barcode reader, etc.) is configured to identify the packages. Based on default and/or administrator-or operator-defined parameters set within software system 304, some packages are illustratively diverted into the accumulation area 1004, while other packages may be allowed to continue past the accumulation area to a shipping area. Shipping containers in the accumulation area are illustratively re-circulated, read, and routed to the shipping area when system parameters indicate that such action is appropriate.

There are a variety of interesting features associated with the embodiments of materials handling systems described herein. For example, various system components enable products to be brought to a human operator rather than requiring the operator to move to the products.

Further, sorting mechanism 140 is configured to sort products into specific orders, rather than requiring operators to pick up the products and sort them, for example based on digital lights, etc.

Further, products can be routed through multiple stamping machines while maintaining product identity. If one stamping machine is stamping for one state, a second stamping machine can be stamping for a different state. However, orders from both states can be picked in the same batch.

Further, multiple products can be handled simultaneously. For example, at the end of sorting mechanism 140, multiple cartons (e.g., six cartons) can be picked up. Cartons can be picked up in groups of three, two, six, etc.). In one embodiment, due to the functionality of a sorting mechanism 140, when the operator retrieves a group of cartons, the cartons come directly proximate to the case in which they are to be located. This list of benefits is not exhaustive. These are just examples of many potential benefits.

As has been described, the picking process that occurs early on within the flow of materials handling system can be organized around the concept of a batch. As has been described, a single batch may contain products from different orders. The assumption is that orders can be mixed up within a batch because other mechanisms are utilized downstream in the system in order to organize on an order-specific basis. In one embodiment, the process of organizing into order-specific groups occurs not just downstream of the picking process but also downstream from the stamping process (i.e., downstream from one or more incorporated stamping machines). Thus, in one embodiment, products are not organized into order-specific groups when they are moved through the stamping process.

As has been described, FIG. 5 is a perspective view of the stamping area within materials handling system 100. FIG. 5 illustratively shows products as they are exiting the picking area and approaching stamping machines 106. The products are illustratively organized around the concept of a batch as described in the immediately previous paragraph. The details of how products are identified and moved relative to the stamping machines are discussed elsewhere in the present specification.

Figure 11:
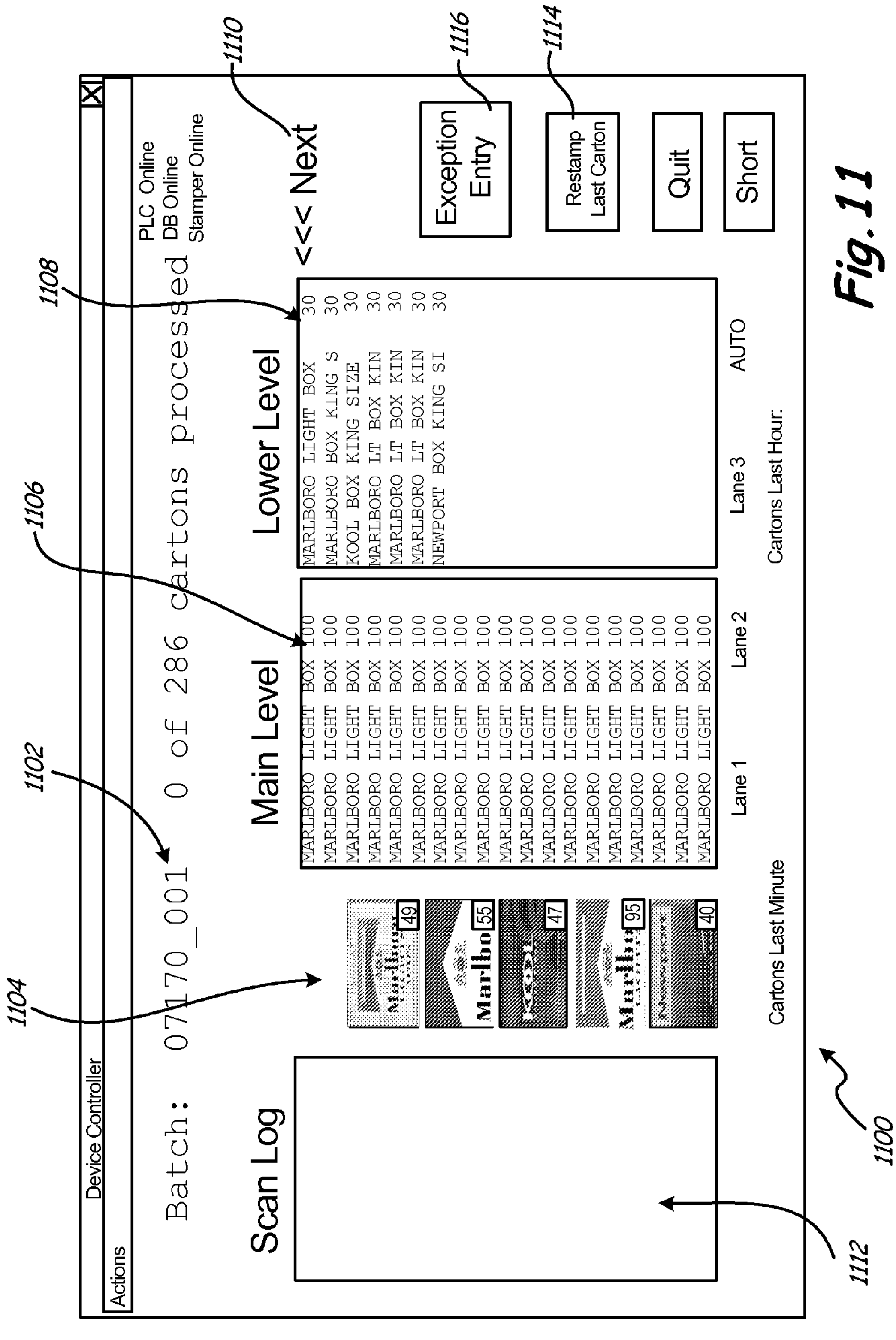
FIG. 11 is a user interface of the materials handling system.

FIG. 5 shows the interface 112 associated with each stamping machine. FIG. 11 is an example of a screenshot 1100 that, in one embodiment, is provided through interface 112. As is indicated in a header 1102, the associated stamp machine is processing a batch numerically identified as batch 07170_001. Assumedly, different batches are assigned different numerical identifiers. As is also indicated in header 1102, the batch includes 286 cartons of which none have yet been processed through the stamp machine.

A batch breakdown area 1104 shows, on a product-by-product specific basis, the components of the batch about to be processed through the stamp machine. A photograph-type presentation of a label is provided for each product. In an embodiment, the photo-type labels or other types of labels are in color. In some embodiments, the labels are representative of cigarette carton packaging. The number associated with each label photo is an indication of how many cartons of the product are included in the batch. For example, the illustrated batch (i.e., batch 07170_001) includes 49 cartons of the Marlboro Light 100 brand, 55 cartons of the regular Marlboro brand, 47 cartons of the Kool brand, 95 cartons of the Marlboro Light brand, and 40 cartons of the Newport brand, which added together equals the total 286 cartons in the batch. In one embodiment, the product labels within 1104 are ordered from top to bottom based on an expected order in which cartons are to be moved through the stamping machine (e.g., the Marlboro Light 100 brand is expected before the regular Marlboro brand and so on and so forth with the Newport brand being the last expected brand).

In one embodiment, within area 1104, the number associated with each label photo is dynamically updated to reflect the current status of processing. For example, upon confirmation that a first Marlboro Light 100 carton has been properly accounted for, the number 49 is updated to 48. Upon confirmation that a second Marlboro Light 100 carton has been properly accounted for, the number 48 is updated to 47, and so on and so forth. Once all 49 of the Marlboro Light 100 cartons have been accounted for, the regular Marlboro brand cartons are similarly counted down. In one embodiment, once all cartons have been accounted for within a given category, the visual indicator for that category is either removed or remains on the display with an indication that all cartons within that category have been accounted for. The process repeats until all cartons within the batch have been accounted for.

In the immediately preceding paragraph, it was mentioned that the display is dynamically updated upon confirmation that a product has been properly accounted for. In one embodiment, this means confirmation by human-actuated input (e.g., through interface 114 of the stamping machine 106) that sends a signal to the appropriate software component. For example, a human-initiated button press can be utilized to generate the feedback that is provided to the software system and used as a basis to confirm the product of a correct next type moving into the stamping machine.

Also or alternatively, the confirmation could be automated. For example, a barcode scanner configured to scan a carton barcode can be utilized to generate the feedback that is provided to the software system and used as a basis to confirm product of a correct next type moving into the stamping machine. Also or alternatively, a photographic scanner that captures an image of some or all of a carton can be utilized to generate the feedback that is provided to the software system and used as a basis to confirm a product of a correct next type moving into the stamping machine. Also or alternatively, an RFID reader configured to read a carton RFID tag can be utilized to generate the feedback that is provided to the software system and used as a basis to confirm a product of a correct next type moving into the stamping machine. These are just examples of automated feedback systems. Those skilled in the art will appreciate that any other automated feedback system could be similarly integrated without departing from the scope of the present invention.

It should also be mentioned that a feedback system as described can be implemented in a variety of different places within the system flow. In other words, the identity of a carton can be gathered in a number of different places. For example, the information can be gathered from a carton before it enters the stamping machine (e.g., anywhere upstream from the stamping machine). Alternatively, it could be gathered while the carton is within the stamping machine. These are but two alternatives to be considered within the scope of the present invention.

Turning back to the description of screenshot 1100, a carton breakdown area 1106 shows, on a carton-by-carton basis, the components of the batch expected to arrive on the upper conveyor. A bulk breakdown area 1108 shows, on a case-by-case basis, the components of the batch expected to arrive on the lower conveyor. An Indicator 1110 demonstrates that the top line is what is immediately expected next. In other words, similar to area 1104, the lists within areas 1106 and 1108 are ordered from top to bottom based on an expected order in which products are to be moved through the stamping machine.

In one embodiment, area 1106 and/or 1108 is configured to dynamically update based on human-initiated and/or automated feedback in a manner similar to that described in relation to area 1104. For example, in one embodiment, upon confirmation of the processing of the top carton listed in area 1106, the list will "move up" by removing the top entry, shifting each entry up one position, and then adding a new entry to the bottom of the list. In another embodiment, upon confirmation (e.g., through human-initiated feedback) that the 30 cartons in the top case listed in area 1108 have been manually removed from the bottom conveyor and placed in cue for entry into the stamping machine, the top case listed in area 1108 will be removed and each remaining entry will be shifted up one position.

Accordingly, one skilled in the art will appreciate how the user interface associated with screenshot 1100 will systematically update on a dynamic basis so as to provide an excellent visual representation of the processing of the batch through the stamping machine. Area 1112 provides a space for displaying data gathered by one or more of the described automated systems for gathering feedback for carton identification purposes (no actual data is shown within area 1112 in FIG. 11).

As cartons move through the stamping machine, it is certainly conceivable that some sort of error will occasionally occur. For example, certainly not by limitation, a stamp head might misfire, an unexpected carton might be encountered by one of the feedback systems, a heavily damaged carton might need to be removed from the process, etc. The software associated with screenshot 1100 illustratively includes functionality for managing such errors. In one embodiment, the software is configured to halt the movement of products upstream from the stamping machine (e.g., within the picking area, transportation from the picking area to the stamping area, etc.) until such errors have been addressed and/or resolved. In one embodiment, user interface 1100 provides an operator of the stamping machine with access to functions and/or tools (e.g., functions and/or tools accessed by activating buttons 1114, 1116, etc.) for managing and/or resolving errors in the processing of the products and/or the update and flow of the user interface 1100. User interface 1100 is advantageous in an exception scenario because it provides an easy to understand visual representation of the correct sequence. In one embodiment, the system is configured to provide, through interface 1100 or an associated interface, visual cues as to what action needs to be taken to remedy an exception or error scenario.

In one embodiment, a user interface (or function integrated into interface 1100) is provided that enables the operator to explain what they did to remedy an error or an exception. The software is illustratively configured to analyze all available information (including the operator input when available) and automatically derive the cause of the exception. In one embodiment, the software system includes a reporting functionality that supports creation of reports that explain when exceptions occurred, how frequently they occurred, why they occurred, who was watching the stamping machine when they occurred, etc.

Notably, screenshot 1100 contains no information that associates an individual carton with a particular order. In one embodiment, the 286 cartons included in batch 07170_0001 are associated with different orders. As was described in the context of the picking process, the components of a batch can be organized based on any of a variety of different user-selected and/or default parameters. For example, not by limitation, batches can be created so as to optimize one or more of the following constraints: 1) desired order completion cutoff time; 2) desired truck route or routes; 3) desired carton size or sizes in a batch; 4) target overall batch size; and/or 5) target work effort to complete the batch. Notably, in all of these examples it is not necessary for cartons in the batch to come from a single order. The components of multiple orders can be mixed within the batch. In one embodiment, all available orders are merged into the batching process.

As mentioned previously, FIG. 5 interface 112 need not be limited to the interface shown in FIG. 11 screenshot 1100. In another embodiment, a screenshot does contain information that associates an individual carton with a particular order. For example, in an embodiment, interface 112 includes information indicating what orders are in a batch, which order each carton belongs to, what tax authority is associated with each carton, and what stamp head or heads are used for each carton. In an embodiment, user interface 112 is configurable to include and display whatever categories of information are desired. In another embodiment, user interface 112 is configured to be toggled so as to alternate between displaying different sets of information.

A scenario was described above wherein an automated feedback system is implemented in order to gather the identity (e.g., the brand) of a carton before it is stamped by the stamping machine, indeed, in one embodiment, even before the carton enters the stamping machine (i.e., upstream from the stamping machine). Above, this was described as a means for producing a feedback signal that is utilized as a basis for analyzing the sequence in which products are received (e.g., for determining whether a sequence error or exception should be triggered) and, as a basis for generating corresponding updates to a user interface, such as updates to the information presented within areas 1104, 1106 and 1108 of the user interface described in relation to FIG. 11. In one embodiment, the feedback signal is also or alternatively utilized as a basis for controlling the stamping functionality of the stamping machine.

Figure 12:
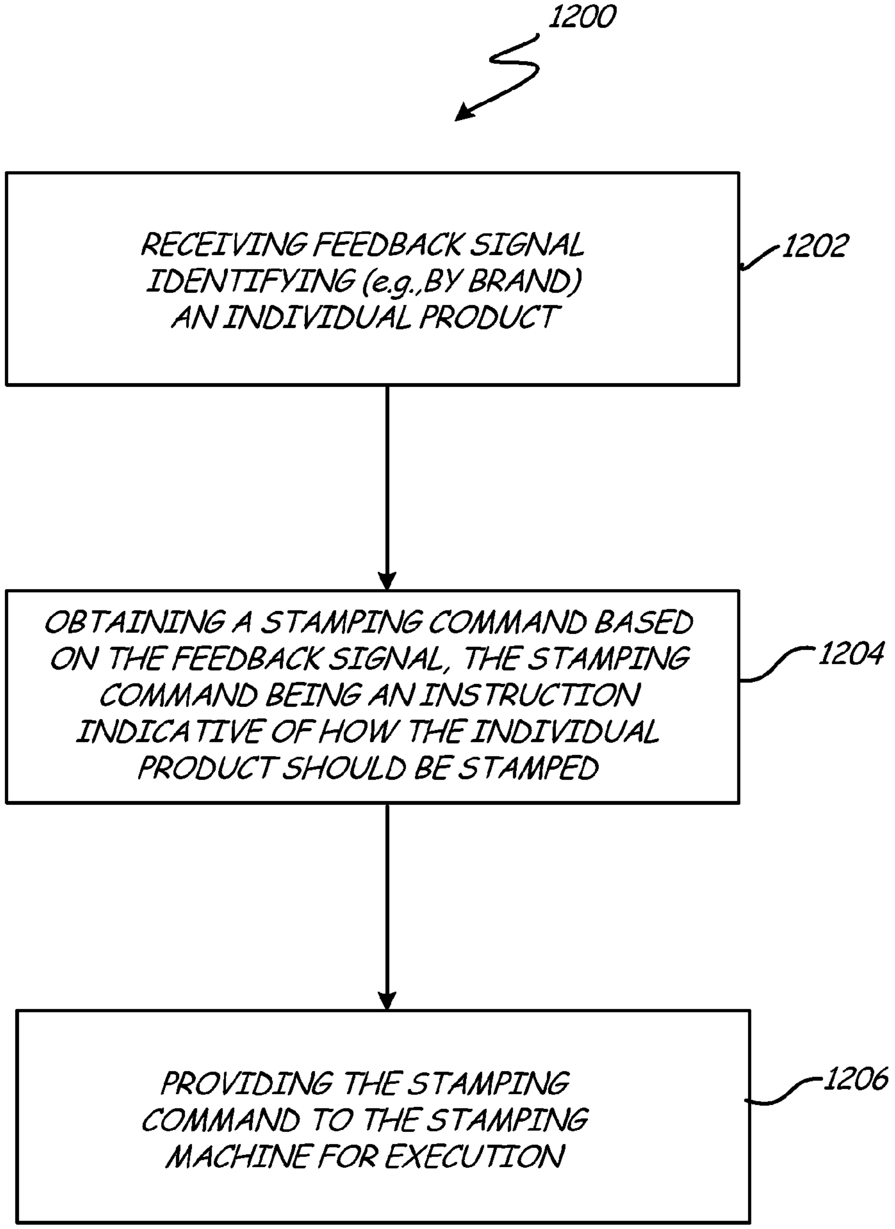
FIG. 12 is a flow chart demonstrating steps associated with a stampling process.

FIG. 12 is a flow chart diagram demonstrating a stamping process 1200 in accordance with one embodiment of the present invention. Process 1200 is illustratively managed by a component of software system 304, for example by stamping machine support components 312. For example, system 304 and components 312 are illustratively computer-readable instructions embedded on a computer readable medium. Some of the instructions, when executed by a computing device, cause a computer to carry out steps such as those illustrated and described in relation to FIG. 12.

In accordance with block 1202, a feedback signal is received and identifies an individual product. For example, the signal illustratively identifies the brand of an individual carton. In one embodiment, the feedback signal is produced by obtaining image data from an optical scanner that processes an outside surface of the individual product, and then analyzing the image data to identify the correct brand. In one embodiment, the scan is captured before the product enters the stamping machine (e.g. upstream from the stamping machine). In one embodiment, the scan is captured while the product is within the stamping machine but before the product has been stamped. As was described in other areas within the present description, the present invention is not limited to an optical scan scenario.

In accordance with block 1204, a stamping command is obtained (e.g., retrieved or generated) based on the feedback signal. The stamping command is illustratively an instruction indicative of how the individual product should be stamped. In accordance with block 1206, the stamping command is provided to the stamping machine for execution. The stamping machine illustratively stamps the individual carton in accordance with the stamping instruction. In accordance with one embodiment, process 1200 is repeated for subsequent individual products as they move through the stamping process. Accordingly, in one embodiment, a separate stamping command is obtained on the fly for each carton that passes through the stamping machine.

It should be noted that process 1200 need not necessarily be carried out exclusively on an individual product basis. In one embodiment, an optical scan is conducted so as to collect image data indicative of multiple products approaching the stamping process. For example, a single image of three consecutive cartons can be captured to support a brand identification of all three cartons and then acquisition (e.g., generation or acquisition) of three corresponding stamping commands, each stamping command being separately executed by the stamping machine. Notably, it is conceivable that each stamping command might involve firing a different stamping head. In other words, there is no restriction that the cartons must be stamped by the same stamping head.

The significance of the described system configurations becomes quickly apparent when compared to prior art systems. For example, in one prior art configuration, a stamping machine receives and executes a collective stamping command. In essence, the collective stamping command dictates how (i.e., which stamping head) the products (note plural) within a particular order are to be stamped. As a product enters the stamping machine, or while the product is well within the stamping machine, the product bar code is scanned and, based on that collected information, a verification process is applied in order to confirm that the product is part of the particular order being stamped in accordance with the collective stamping command.

There are several disadvantages associated with the noted and similar prior art configurations. For example, the noted system is quite limited in terms of how quickly it is able to move products through the stamping machine. Because scanning occurs while the product is entering or within the stamping machine, the finalization of how the product will be stamped occurs very close in time to the actual stamping of the product. There is an inherent limit as to how fast products can be fed through the stamping machine and still leave enough time to confirm or deny inclusion of each product within a currently active standing stamping command. The limit forces processing to move at a speed that is less than the maximum reasonable speed at which the stamping machine is capable of stamping a stream of products.

In contrast, in one embodiment, the present invention proposes identifying a product further upstream and finalizing the stamping instruction for a product much earlier, even before the product ever enters the stamping machine. Accordingly, products can be stamped at a much greater rate.

Another disadvantage associated with the noted system is that group-oriented stamping typically involves many instances of consecutive products being stamped with the same stamp head (i.e., because it is most common for products in the same order to require the same stamp). Of course, a given stamp head can only stamp one product at a time. Thus, this also limits the rate at which stamping can be conducted. Of course, multiple stamp heads can be configured to apply the same stamp, but this limits the flexibility of the stamping machine. Another way of looking at the prior art systems is that, in such systems, the stamping machine is instructed to activate a particular stamp head. Following activation, the stamping machine is essentially locked into that head.

In contrast, the present invention proposes instructing the stamping machine to activate a particular head on a carton by carton basis. Thus, the present system is not limited to organizing cartons into order-based groups. The prior art links a stamp head specifically to a set of cartons, while the present invention links a stamp head to a specific carton. Being carton specific is an advantage because as products move through the stamping machine organized based not on order but on batch, there will be more instances where stamping heads will alternate. This increases opportunity for moving products through the stamping machine at a faster rate. Every product can move in and through the stamping machine before its predecessor has exited the stamping machine. More than two products can be within the stamping machine at the same time (e.g., two in a machine while a third one is entering). This is better than the prior art stop and go alternative. Every product can be associated with a different order, and every product can use a different stamping head than its predecessor.

Further, embodiments of the present invention are not limited to scanning barcodes to identify which order is associated with a product. The scan information necessary to support embodiments of the present invention is less invasive. All that is required is an identification of brand. For example, as has been described, a visual scanner can be utilized. As has been described, multiple products can even be simultaneously scanned for especially efficient identification, which leads to especially efficient generation and execution of the carton-specific stamping commands. This is not to say that embodiments of the present invention cannot also incorporate a barcode scan process. For example, a barcode can be incorporated in combination with the visual scanner, for example, to validate or confirm the visual brand identification process. In one embodiment, not by limitation, the barcode scan and/or the optical scan is conducted upstream from the stamping machine rather than within the stamping machine itself, though either or both could be conducted within the stamping machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium having instructions embedded thereon that, when executed, cause a computing device to provide a user interface associated with a tobacco product stamping machine, wherein the user interface comprises:

a visual representation of a batch of tobacco product containers;

wherein the visual representation includes an indication of a plurality of tobacco product types included in the batch;

wherein the visual representation includes an indication of a number of containers of a first tobacco product type included in the batch; and wherein the indication of a plurality of tobacco product types comprises a presentation of the tobacco product types organized based on an anticipated sequence in which the product types are to be processed by the tobacco product stamping machine.

2. A computer-readable medium having instructions embedded thereon that, when executed, cause a computing device to provide a user interface associated with a tobacco product stamping machine, wherein the user interface comprises:

a visual representation of a batch of tobacco product containers;

wherein the visual representation includes an indication of a plurality of tobacco product types included in the batch;

wherein the visual representation includes an indication of a number of containers of a first tobacco product type included in the batch; and wherein the user interface dynamically updates the indication of the number of containers of the first tobacco product type, and wherein dynamically updating comprises dynamically updating to reflect stamping by the tobacco product stamping machine of containers of the first tobacco product type.

3. The computer-readable medium of claim 2, wherein dynamically updating further comprises dynamically updating to reflect stamping activity by multiple different stamp heads associated with the tobacco product stamping machine.

4. The computer-readable medium of claim 2, wherein dynamically updating further comprises dynamically updating to reflect application of multiple different tax authority stamps to containers of the first tobacco product type.

5. A computer-readable medium having instructions embedded thereon that, when executed, cause a computing device to provide a user interface associated with a tobacco product stamping machine, wherein the user interface comprises:

a visual representation of a batch of tobacco product containers;

wherein the visual representation includes an indication of a plurality of tobacco product types included in the batch;

wherein the visual representation includes an indication of a number of containers of a first tobacco product type included in the batch; and wherein the user interface is configured to dynamically update the indication of the number of containers of the first tobacco product type such that the number reflects only containers of the first tobacco product type that have not yet been processed by the tobacco product stamping machine.

6. A computer-readable medium having instructions embedded thereon that, when executed. cause a computing device to provide a user interface associated with a tobacco product stamping machine, wherein the user interface comprises:

a visual representation of a batch of tobacco product containers;

wherein the visual representation includes an indication of a plurality of tobacco product types included in the batch;

wherein the visual representation includes an indication of a number of containers of a first tobacco product type included in the batch; and wherein the user interface is configured to dynamically update the indication of the number of containers of the first tobacco product type so as to reflect only containers that have been processed by the tobacco product stamping machine.

7. A computer-readable medium having instructions embedded thereon that. when executed, cause a computing device to provide a user interface associated with a tobacco product stamping machine, wherein the user interface comprises:

a visual representation of a batch of tobacco product containers:

wherein the visual representation includes an indication of a plurality of tobacco product types included in the batch:

wherein the visual representation includes an indication of a number of containers of a first tobacco product type included in the batch; and wherein the visual representation further comprises an indication of a number of containers of a second tobacco product type included in the batch, the second tobacco product type being different than the first tobacco product type.

8. The computer-readable medium of claim 7, wherein the indication of the first tobacco product type and the indication of the second tobacco product type are displayed in an order that is indicative of which tobacco product containers are to be processed first by the tobacco product stamping machine.

9. A computer-readable medium having instructions embedded thereon that, when executed, cause a computing device to provide a user interface associated with a tobacco product stamping machine, wherein the user interface comprises:

a visual representation of a batch of tobacco product containers:

wherein the visual representation includes an indication of a plurality of tobacco product types included in the batch;

wherein the visual representation includes an indication of a number of containers of a first tobacco product type included in the batch; and wherein the indication of the number of containers of the first tobacco product type is a sum of the number of containers of the first tobacco product type included in plurality of different orders.

10. A computer-readable medium having instructions embedded thereon that, when executed, cause a computing device to provide a user interface associated with a tobacco product stamping machine, wherein the user interface comprises:

a visual representation of a hatch of tobacco product containers;

wherein the visual representation includes an indication of a plurality of tobacco product types included in the batch:

wherein the visual representation includes an indication of a number of containers of a first tobacco product type included in the batch; and wherein the batch of tobacco product containers comprises containers derived from a first order and containers derived from a second order.

11. A computer-readable medium having instructions embedded thereon that, when executed, cause a computing device to provide a user interface associated with a tobacco product stamping machine, wherein the user interface comprises:

a visual representation of a batch of tobacco product containers:

wherein the visual representation includes an indication of a plurality of tobacco product types included in the batch;

wherein the visual representation includes an indication of a number of containers of a first tobacco product type included in the batch; and wherein the user interface further comprises a listing of individual tobacco product containers included in the batch.

12. The computer-readable medium of claim 11, wherein the user interface dynamically updates the listing so as to provide an indication of when individual cartons in the listing are assumed to have been processed by the tobacco product stamping machine.

13. The computer-readable medium of claim 11, wherein the user interface dynamically updates the listing so as to remove cartons from the listing that are assumed to have been processed by the tobacco product stamping machine.

14. A computer-readable medium having instructions embedded thereon that, when executed, cause a computing device to provide a user interface associated with a tobacco product stamping machine, wherein the user interface comprises:

a visual representation of a batch of tobacco product containers;

wherein the visual representation includes an indication of a plurality of tobacco product types included in the batch;

wherein the visual representation includes an indication of a number of containers of a first tobacco product type included in the batch; and wherein the indication of a plurality of tobacco product types comprises at least one pictorial representation of information printed on the outside of a tobacco product container.

15. A computer-readable medium having instructions embedded thereon that, when executed, cause a computing device to provide a user interface associated with a tobacco product stamping machine, wherein the user interface comprises:

a visual representation of a batch of tobacco product containers;

wherein the visual representation includes an indication of a plurality of tobacco product types included in the batch;

wherein the visual representation includes an indication of a number of containers of a first tobacco product type included in the batch; and wherein the indication of a plurality of tobacco product types comprises at least one trademark as printed on the outside of a tobacco product container.

16. A computer-readable medium having instructions embedded thereon that, when executed, cause a computing device to provide a user interface associated with a tobacco product stamping machine, wherein the user interface comprises:

a visual representation of a batch of tobacco product containers:

wherein the visual representation includes an indication of a plurality of tobacco product types included in the batch:

wherein the visual representation includes an indication of a number of containers of a first tobacco product type included in the batch; and wherein the indication of a plurality of tobacco product types comprises at least one color image representing information printed on the outside of a tobacco product container.

* * * * *

UNITED STATES PATENT AND TRADEMARK OFFICE

CERTIFICATE OF CORRECTION

PATENT NO. : 7,933,674 B2
APPLICATION NO. : 12/053039
DATED : April 26, 2011
INVENTOR(S) : David S. Driskill et al.

It is certified that error appears in the above-identified patent and that said Letters Patent is hereby corrected as shown below:

Title Page

Item [56] References Cited

"6,680,452" should be --6,680,485--.

Column 19,

Line 63, delete "hatch" and insert --batch--.

Signed and Sealed this
Third Day of January, 2012

David J. Kappos
*Director of the United States Patent and Trademark Office*